United States Patent [19]

Bredow

[11] 4,335,296
[45] Jun. 15, 1982

[54] MACHINE TOOL WITH A LASER BEAM CUTTING DEVICE

[75] Inventor: Walter Bredow, Alfeld, Fed. Rep. of Germany

[73] Assignee: C. Behrens AG, Alfeld, Fed. Rep. of Germany

[21] Appl. No.: 172,845

[22] Filed: Jul. 24, 1980

[30] Foreign Application Priority Data

Aug. 21, 1979 [DE] Fed. Rep. of Germany ....... 2933700

[51] Int. Cl.³ ............................................. B23K 27/00
[52] U.S. Cl. ...................... 219/121 LG; 219/121 LY; 219/121 LK
[58] Field of Search ................. 219/121 LG, 121 LN, 219/121 LU, 121 LV, 121 LY, 121 LK, 121 LH, 121 LL, 121 LJ, 121 LM, 121 LQ, 121 LR, 121 L, 121 EC, 121 ED, 121 EH, 121 EK; 83/667, 668, 405, 406, 170, 177, 916, 917, 412–414, 859, 552

[56] References Cited

U.S. PATENT DOCUMENTS

| | | | |
|---|---|---|---|
| 2,861,166 | 11/1958 | Cargill, Jr. .................... | 219/121 LM |
| 3,369,101 | 2/1968 | DiCarcio ......................... | 219/121 L |
| 4,074,104 | 2/1978 | Fulkerson ................... | 219/121 LY X |
| 4,170,726 | 10/1979 | Okuda ........................ | 219/121 FS X |
| 4,201,905 | 5/1980 | Clark et al. ..................... | 219/121 L |
| 4,223,201 | 9/1980 | Peters et al. .............. | 219/121 LU X |
| 4,229,640 | 10/1980 | Longo .......................... | 219/121 L X |

OTHER PUBLICATIONS

E. Locke, et al., *IEEE Journal of Quantum Electronics*, "Metal Processing with a High-Power $CO_2$ Laser", vol. QE-10, No. 2, pp. 179-185, Feb. 1974.

*Primary Examiner*—C. L. Albritton
*Attorney, Agent, or Firm*—Michael J. Striker

[57] ABSTRACT

A machine tool comprising at least one vertically reciprocating tool, such as a punch or the like, and a laser beam cutting device for cutting a workpiece thereunder positioned by a coordinate table movable in a plane in two directions normal to each other, in which the laser beam cutting head of the laser beam cutting device and the protecting tube connecting the laser beam cutting device with a laser generator are mounted on an overhang beam carrying the laser beam cutting head at one end thereof above a workpiece on the table and in which the overhang beam is connected at the other end thereof to a sleeve which is turnable about the axis of an uprgiht column which is independent and disassociated of a machine tool body supporting said reciprocating tool so that vibrations created during operation of the reciprocating tool are not transmitted to the laser beam cutting head.

9 Claims, 4 Drawing Figures

MACHINE TOOL WITH A LASER BEAM CUTTING DEVICE

BACKGROUND OF THE INVENTION

The present invention relates to a machine tool with at least one vertically reciprocating tool and a laser beam cutting device adapted to operate on a workpiece mounted on a horizontally arranged coordinate table movable relative to the tool, respectively the laser beam cutting device, in a horizontal plane and in two directions normal to each other.

Machine tools of this type are basically known in the art. For instance, a stamping, respectively nibbling machine for machining plate-shaped sheet metal parts is known in the art in which the workpiece is fed into the machine by means of a coordinate table which is movable in longitudinal and transverse direction and in which the machine is also provided with a cutting device operating according to the plasma-arc method, and the workpiece is then moved by the table along a desired path to thus be provided by the cutting device with any desired cutouts.

A tool machine of the combination of the above mentioned kind is also known in the art in which the laser beam cutting device comprises a laser generator spaced away from the machine tool but with a laser beam cutting apparatus as such which is directly carried by the body of the machine tool and therewith is subjected to the vibrations occurring during operation of the reciprocating tool. Such a laser beam cutting device will provide better cutting results than cutting devices operating according to the plasma-arc method. These better cutting results are obtained in that with a laser beam cutting device narrow cuts with substantially parallel side faces are obtained, whereas for instance with a cutting device operating according to the plasma-arc method the resulting slits will open in downward direction. While the use of a laser beam cutting device in connection with a punching or nibbling machine appears especially desirable, there result in practice certain problems from such a combination, in that the optical device of a laser beam cutting head with reversing mirror and condenser lens has to be exactly adjusted and kept free from influences which would disturb such an exact adjustment. It is especially detrimental for a satisfactory operation if vibrations, which during operation of a punching or nibbling machine are unavoidable, are transmitted to the sensitive elements of the laser beam cutting head, especially to the optical devices thereof for adjusting the laser beam, which is unavoidable with the above-mentioned machine tools according to the prior art.

SUMMARY OF THE INVENTION

It is an object of the present invention to provide a machine tool of the above-mentioned kind, that is a machine tool with at least one reciprocating punching tool or the like and a laser beam cutting device in which the vibrations occurring during operation of the reciprocating tool are not transmitted to the laser beam cutting device, especially to the optical parts of the latter.

With these and other objects in view, which will become apparent as the description proceeds, the machine tool according to the present invention mainly comprises a coordinate table movable in a horizontal plane in two directions normal to each other and adapted to carry a workpiece for movement therewith and relative thereto, an elongated machine tool body, a vertically reciprocatable tool located at one end of the machine tool body for punching the workpiece moved under the tool by the table, a laser beam cutting device including a laser cutting head, an overhang beam carrying at one end thereof the laser beam cutting head above the plane in which a workpiece on the table is movable, and means supporting the overhang beam independently of and disassociated from the machine tool body supporting the reciprocating tool, so that vibrations created during operation of the tool are not transmitted to the laser beam cutting device.

The means supporting the overhang beam preferably comprise a stationary upright column and a sleeve turnable about the axis of the column and carrying the overhang beam and the laser cutting head for movement between a working position adjacent the reciprocatable tool and a position outwardly moved away therefrom. In this way, the reciprocating tool or tools of the machine tool may be easily accessible if the tool or tools should be exchanged against a different one.

Preferably means are also provided which cooperate with the aforementioned sleeve for releasably holding the latter in a position in which the overhang beam and the laser cutting head thereon are in the working position. Furthermore, a safety circuit may also be provided which cooperates with the sleeve for preventing operation of the laser beam cutting device when the overhang beam and the laser cutting head thereon are turned away from the working position.

The overhang beam in the working position preferably extends substantially parallel to the elongated machine body.

The laser beam cutting device comprises further a laser generator and a protecting tube connecting the laser generator with the laser cutting head and the protecting tube is at least in part carried on the overhang beam.

According to a further feature of the present invention, the support means for supporting the coordinate table for movement in the aforementioned plane are arranged separate from the support of the overhang beam and also separate from the elongated machine body carrying the reciprocating tool. This will assure that vibrations resulting from a fast acceleration or braking of the various parts of the table with the workpiece thereon are, as far as possible, kept away from the laser beam cutting device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
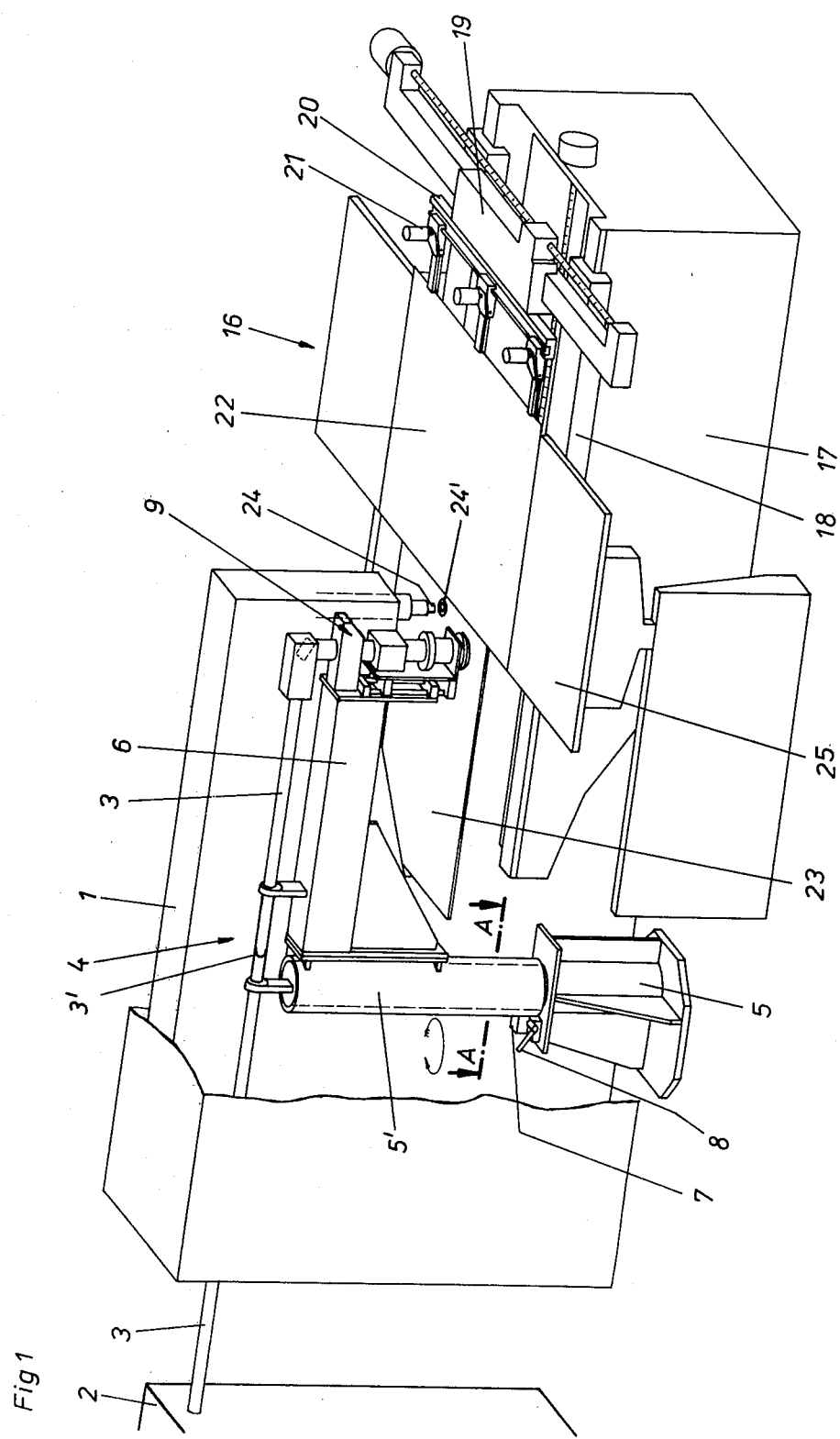
FIG. 1 is a schematic perspective view of the machine tool according to the present invention.

As can be seen from FIG. 1, there is provided laterally of an elongated machine tool body 1 of the machine tool constructed as a punching press with a single punching tool or as a press with a tool magazin such as well-known turret punch presses with a plurality of punches and dies in turnable cooperating upper and lower turrets a laser beam cutting head 9 with its protecting tube 3 arranged on a boom 4 which is mounted on the floor, respectively, the foundation completely separated from the machine tool body 1, as well as from a coordinate table 16. The boom 4 comprises an upright column 5 and an overhang beam 6 substantially normal thereto.

Figure 2:
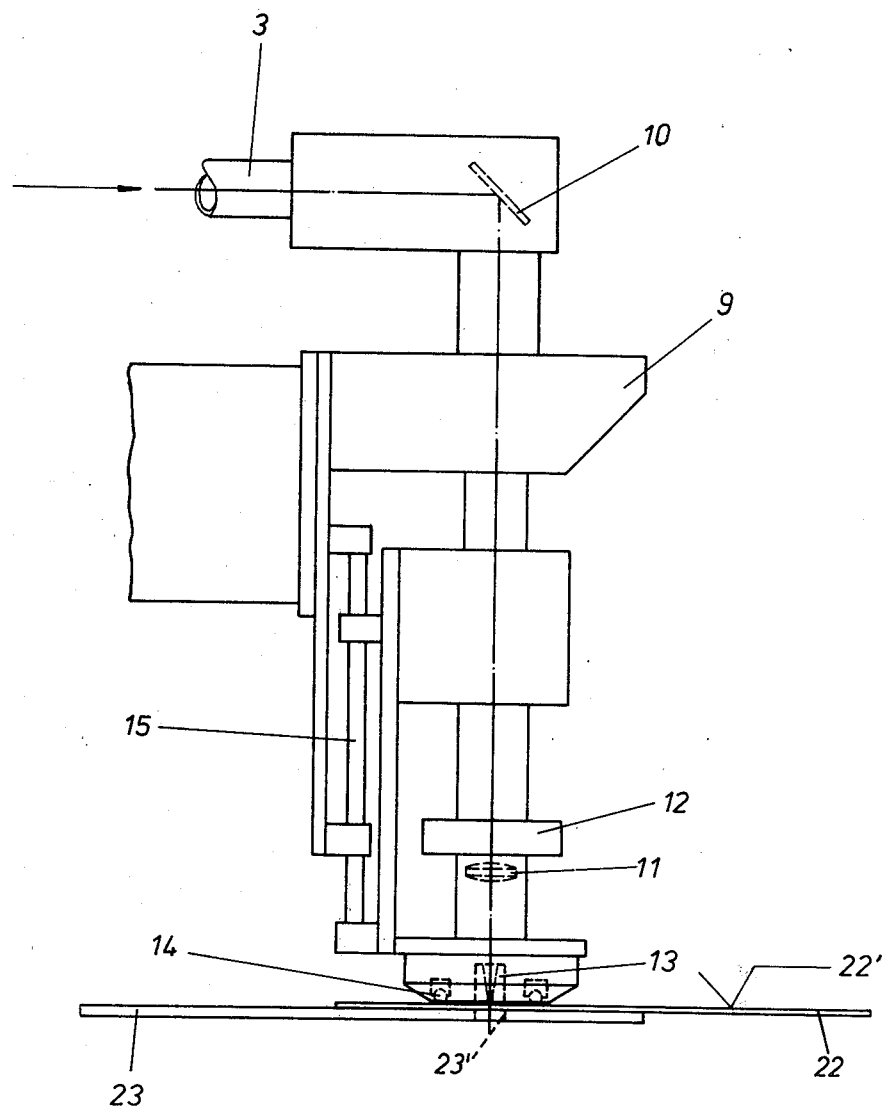
FIG. 2 is an enlarged side view of the laser cutting head.

The laser beam cutting head 9, best shown in FIG. 2, comprises a mirror 10 extending at an angle of 45° to the horizontal which deflects the laser beam passing in horizontal direction from the laser generator 2 through the protecting tube 3 through 90° so that the laser beam will pass from the mirror 10 in a direction substantially normal to a workpiece 22 on the coordinate table 16. The laser beam cutting head 9 further comprises a condenser lens 11 which focusses the laser beam onto the workpiece 22 to be cut, so that the laser energy will be used to an optimal extent. The focussed laser beam is directed through a nozzle 13 through which, in a manner known per se, cutting gas (oxygen or air under pressure) is directed to support the cutting process. FIG. 2 also schematically illustrates an adjusting mechanism 12 known per se, and not forming part of the present invention, for adjusting the condenser lens 11. In order to assure that the adjusted focal point of the laser beam will remain in an optimal position to the upper surface 22' of the workpiece 22, the laser beam cutting head 9 is provided with a mechanism 15, only schematically shown in FIG. 2, which presses the balls 14 at the bottom of the laser beam cutting head 9 against the surface 22' so that the nozzle 13 and the condenser lens 11 will always remain at the same distance from the surface 22' of the workpiece. The mechanism 15 may be operated by a pneumatically or hydraulically operated cylinder-and-piston unit, not shown in the drawing, which presses the balls 14 against the surface 22' of the workpiece or which can lift the cutting head 9 out of engagement with the workpiece.

Figure 3:
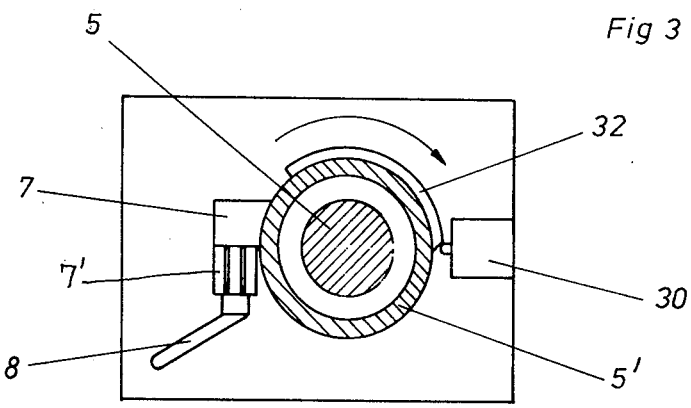
FIG. 3 is a section taken along the line A—A of FIG. 1.

The boom 4 which carries the laser beam cutting head 9 and part of the protecting tube 3 can be constructed rigid or tiltable, but important is that the boom has no direct connection to the elongated machine tool body 1 or to the support 17 for the coordinate table 16 so that vibrations which are generated by the machine tool, respectively by the coordinate table, are not transmitted to the optical system (mirror 10 and condenser lens 11) to move the same from its adjusted position. In a preferred construction, as illustrated in the drawing, the boom 4 is tiltably constructed to facilitate access to the tool 24 carried at the front end of the machine tool body 1. In this preferred construction the boom 4 comprises a vertical column 5 and a tubular member or sleeve 5' turnable about the axis of the column 5 and the overhang beam 6 of the boom is connected to the upper end of the sleeve 5' for turning therewith about the axis of the column 5. Means are also provided which cooperate with the sleeve 5' to releasably arrest the same in a position in which the laser beam cutting head 9 at the outer end of the overhang beam is in a working position. Such arresting means preferably include an abutment 7 mounted on the sleeve 5'. There is further provided a stop element 7' mounted on the column 5. For arresting purposes the abutment 7 is pushed against the stop element 7' by means of the screw 8 as schematically illustrated in FIG. 3. The protecting tube 3 is divided into two parts abutting against each other in the working position of the overhang beam 6 at 3' so that the portion of the protecting tube carried by the overhang beam 6 may be turned together with the latter from the working position shown in FIG. 1 to a turned position. Of course, it is also possible to insert a flexible portion at the location 3' into the protecting tube 3 to permit turning of the portion of the protecting tube mounted on the overhang beam 6 relative to the remainder thereof.

Figure 4:
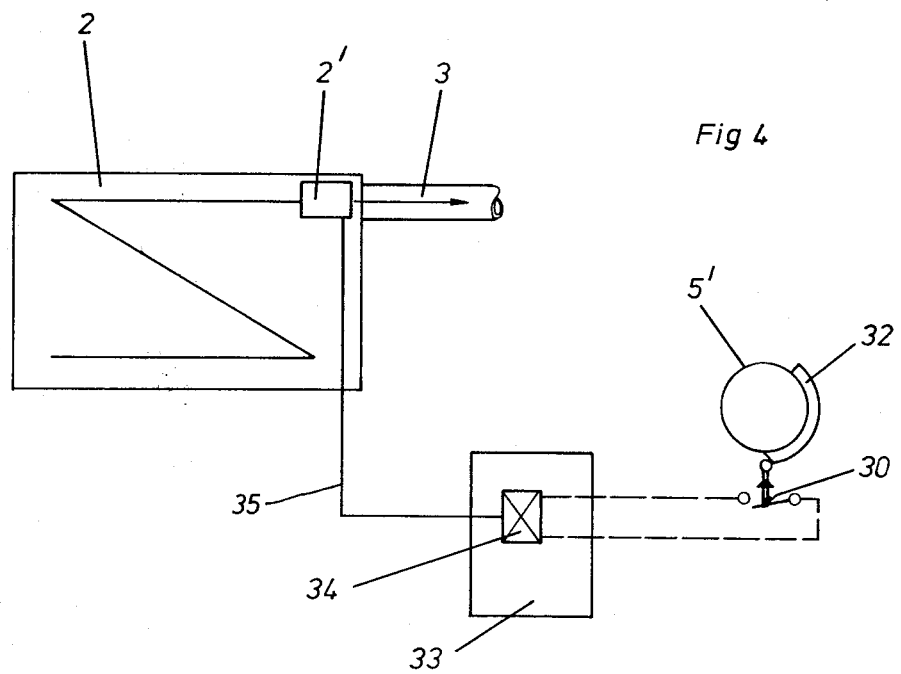
FIG. 4 is a schematic illustration of the arrangement preventing operation of the laser beam cutting device when the overhang beam carrying the same is turned away from its working position.

As mentioned before, there is provided a safety arrangement preventing a laser beam from leaving the generator 2 and so, of course, also a passage to the laser beam cutting head 9 when the latter is turned away from the working position shown in FIG. 1. Such a safety arrangement may include, as schematically shown in FIG. 4, a cam 32 fixed to the lower end of the sleeve 5' and cooperating with a switch 30 to open the latter when the sleeve 5' is turned in clockwise direction from the position as shown in FIG. 1. Opening of the switch 30, in turn, causes de-energizing of a relay 34 in a switch box 33 which opens the circuit 35 leading to a shutter magnet 2' which causes a shutter, not shown in FIG. 4, to close to prevent thereby passing of a laser beam from the laser beam generator 2 into the protecting tube 3.

The coordinate table 16 shown in FIG. 1 comprises two transversely spaced side plates 25, 25' on elongated U-shaped guide members 18, 18' movable in longitudinal direction on rail portions extending in longitudinal direction, transversely spaced from each other, on the upper surface of the support 17 for the coordinate table 16. The guide members 18, 18', in turn, carry in the region of one end thereof a transverse guide rail 40 fixedly connected thereto, which, in turn, carries a guide member 19 for movement therealong. A rail 20 is carried on a front face of the guide member 19 and the rail 20, in turn, carries a plurality of clamping jaws 21 adjustable in longitudinal direction of the rail 20 and clamping one edge of the workpiece 22. The guide members 18, 18' form together with the side plates 25 and 25' and the transverse guide rail 40 a carriage movable in the direction of the arrow y and moved in this or in the opposite direction by a screw spindle 41 connected thereto which is driven by a motor 42. The member 19 and the elements connected thereto form a transverse carriage for moving the workpiece 20 in and opposite to the direction indicated by the arrow x, and the member 19 is movable by a screw spindle 43 cooperating therewith which is driven by a motor 44. The means for moving the guide members 18 and the guide member 19 are only schematically indicated in FIG. 1 and such means may be programmed in a known manner to move the workpiece 22 along a predetermined path. The arrangement includes further a stationary plate 23 fixed to the body 1 and extending with its right end position, as viewed in FIG. 1, between the side plates 25 and 25'. The plate 23 is formed with a die opening 24' axially aligned and cooperating with the punch 24 and beneath the laser cutting head 9 with a further opening 23' (FIG. 2) to prevent damage of the plate 23 during cutting of the workpiece by the laser beam. The workpiece 20 rests with side portions thereof on the side plates 25 and 25' and may be moved together with the same in the direction of the arrow y and in transverse direction indicated by the arrow x relative to the side plates 25 and 25' by the member 19 and the elements 20 and 21 connected thereto. The space between the side plates 25 and 25' is filled with a non-illustrated downwardly movable center plate for supporting the workpiece 22 when the latter is moved in transverse direction so that one of the lateral edges thereof leaves one or the other of the side plates. The center plate which forms part of coordinate table 16 and moves together with the side plates 25 and 25' in the direction of the arrow y is formed of a flexible configuration and provided at opposite transverse edges thereof with rollers moving in downwardly directed guiding rails attached to the inner edges of the side plates 25 and 25' to bend downwardly of the side plates 25 and 25' when the nonillustrated center plate moves in the direction of the arrow y either toward the right or the left from the position shown in FIG. 1 so that the center plate will not interfere with stationary plate 22 or the clamps 21. It is to be understood that the tool 24 and the laser beam cutting head should not be operated simultaneously and that during operation of the reciprocating tool 24 the lower end of the laser beam cutting head 9 has to be lifted from the workpiece 22. Such lifting of the laser beam cutting head 9 during operation of the reciprocating tool 24 may be carried out in a known manner by programmed impulses from a numerical control.

It will be understood that each of the elements described above, or two or more together, may also find a useful application in other types of machine tools with a reciprocating tool or a plurality of tools in a tool magazine and a laser beam cutting device differing from the types described above.

While the invention has been illustrated and described as embodied in a machine tool with a reciprocating tool and a laser beam cutting device it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A machine tool comprising a horizontally arranged coordinate table; means for moving a workpiece on the table in two directions normal to each other; an elongated machine tool body; at least one vertically reciprocatable tool located in said machine tool body for punching a workpiece moved under the tool by the table; a laser beam cutting device including a laser beam cutting head; an overhang beam carrying at one end thereof said laser beam cutting head above a plane in which a workpiece on the table is movable; and means supporting said overhang beam independent of and disassociated from the machine tool body supporting the reciprocating tool so that vibrations created during operation of the tool are not transmitted to the laser beam cutting device.

2. A machine tool comprising a horizontally arranged coordinate table; means for moving a workpiece on the table in two directions normal to each other; an elongated machine tool body; at least one vertically reciprocatable tool located in said machine tool body for punching a workpiece moved under the tool by the table; a laser beam cutting device including a laser beam cutting head; an overhang beam carrying at one end thereof said laser beam cutting head above a plane in which a workpiece on the table is movable; means supporting said overhang beam independent of and disassociated from the machine tool body supporting the reciprocating tool so that vibrations created during operation of the tool are not transmitted to the laser beam cutting device, and said means supporting said overhang beam including a stationary upright column and a sleeve turnable about the axis of said column and carrying said overhang beam and said laser beam cutting head for movement between a working position adjacent said reciprocating tool and a position moved away therefrom.

3. A machine tool as defined in claim 2, wherein said overhang beam in said working position extends substantially parallel to said elongated machine body.

4. A machine tool as defined in claim 2, wherein said laser beam cutting device comprises further a laser generator and a protecting tube connecting said laser generator with said laser beam cutting head, said protecting tube being at least in part carried on said overhang beam.

5. A machine tool as defined in claim 1, and including support means for supporting said coordinate table, said means for supporting said overhang beam being also independent of and disassociated from said support means of said table.

6. A machine tool as defined in claim 1, and including means mounting said laser beam cutting head on said overhang beam for vertical movement between a first position engaging a workpiece on said table and a second position upwardly lifted therefrom.

7. A machine tool as defined in claim 6, and including rolling means on said cutting head arranged for engaging a workpiece on said table in said first position of said cutting head.

8. A machine tool as defined in claim 2, and including means cooperating with said sleeve for releasably holding the latter in a position in which said overhang beam and the laser beam cutting head thereon are in said working position.

9. A machine tool as defined in claim 8, and including means cooperating with said sleeve for preventing operation of said laser beam cutting device when said overhang beam and the laser beam cutting head thereon are turned away from said working position.

* * * * *